PALMER & INGALLS.
Churn Dasher.
No. 37,357.
Patented Jan'y 6, 1863.
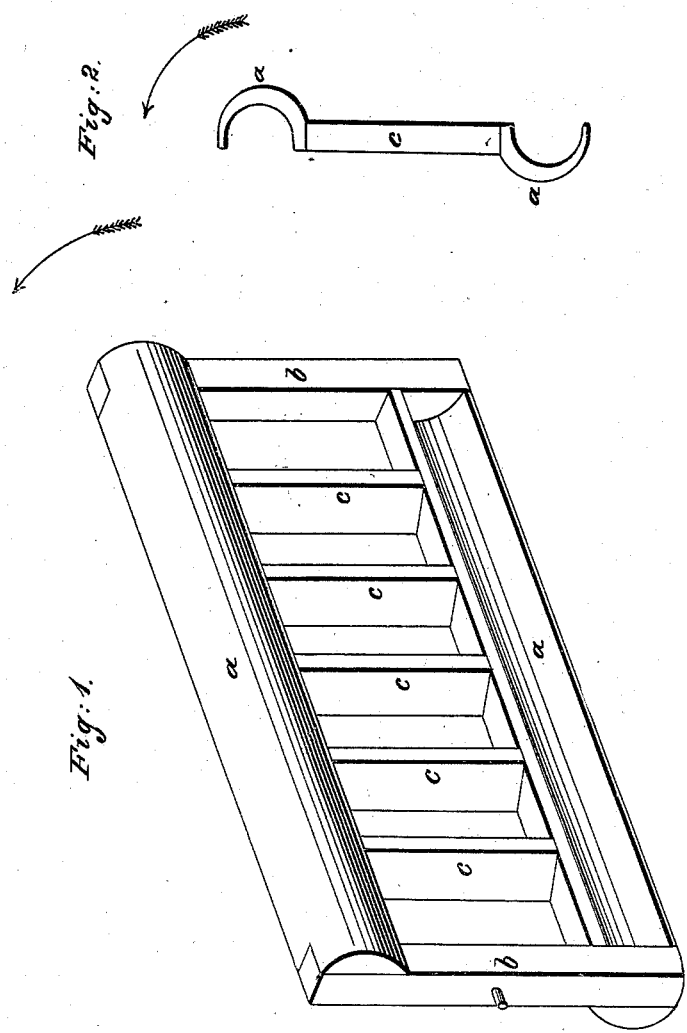

UNITED STATES PATENT OFFICE.

MILTON J. PALMER, OF HOMER, AND HENRY R. INGALLS, OF GROTON, NEW YORK.

IMPROVEMENT IN CHURN-DASHERS.

Specification forming part of Letters Patent No. 37,357, dated January 6, 1863.

*To all whom it may concern:*

Be it known that we, MILTON J. PALMER, of Homer, in the county of Courtland and State of New York, and HENRY R. INGALLS, of Groton, in the county of Tompkins and State aforesaid, have invented a new and Improved Churn-Dash for Churns; and we do hereby declare that the following is a full, clear, and exact description of the construction and operation of the same, reference being had to the annexed drawings, making a part of this specification, in which—

Figure 1 is a perspective view, and Fig. 2 a transverse section, like letters referring to like parts.

$a\ a$ are floats firmly fastened at the ends upon the cross-bars $b\ b$. In the centers of the latter, at $b\ b$, are the journals upon which the dash revolves. The floats $a\ a$ being hollowed out on their front face, referring to the direction in which they revolve, as shown by the arrow, the trough in the float is closed at the ends by the cross-bars $b\ b$. The slats $c\ c$ are thin strips extending across from one float to the other, and at right angles to such floats, but with their side faces set at an angle of about forty-five degrees with the plane in which the dash revolves.

The operation of this dash is such that the floats $a\ a$, by means of the circular groove in them, carry air into the cream, the dash revolving horizontally, and the slats $c\ c$, by being set at the angle aforesaid, not only cut or divide the cream in passing through it, but throw it one side and the other at each entire revolution, as at every half-revolution the said slats present their side faces on opposite sides, thus rapidly and thoroughly agitating the cream. In practice it is found to do the work quickly and effectually.

We do not claim the floats $a\ a$ or their peculiar form.

What we do claim, and desire to secure by Letters Patent, is—

The manner of setting the slats $c\ c$ across the dash from float to float, with their side faces at an angle to the plane in which the dash revolves, when used in combination with said floats $a\ a$, substantially as above described.

MILTON J. PALMER.
HENRY R. INGALLS.

Witnesses:
C. FOSTER,
W. R. BROWNE.